United States Patent

Shaffer et al.

Patent Number: 6,048,511
Date of Patent: Apr. 11, 2000

[54] METHOD FOR FORMING HIGH DENSITY BORON NITRIDE AND HIGH DENSITY AGGLOMERATED BORON NITRIDE PARTICLES

[75] Inventors: Gregory W. Shaffer, Strongsville; Richard Frank Hill, Chargrin Falls, both of Ohio

[73] Assignee: Advanced Ceramics Corporation, Lakeland, Ohio

[21] Appl. No.: 09/225,820

[22] Filed: Jan. 5, 1999

Related U.S. Application Data

[62] Division of application No. 08/968,959, Nov. 12, 1997, Pat. No. 5,898,009, which is a continuation of application No. 08/618,361, Mar. 19, 1996, abandoned.

[51] Int. Cl.[7] .......................... B29C 67/02; C01B 21/064
[52] U.S. Cl. ............................................. 423/290; 264/117
[58] Field of Search .......................... 423/290; 501/96.4; 264/65, 117, 118

[56] References Cited

U.S. PATENT DOCUMENTS 5,064,589  11/1991  Ichikawa et al. ....................... 423/290

Primary Examiner—Wayne Langel
Attorney, Agent, or Firm—Eugene Lieberstein; Michael N. Meller

[57] ABSTRACT

A method of forming pellets or agglomerates of high density boron nitride from high purity hexagonal boron nitride by crushing the high purity hexagonal boron nitride into boron nitride particles extending over a size range of at least 100 microns with the majority of the particles having a particle size above 50 microns and cold pressing the crushed particles into a compacted form. The compacted form is then granulated into a granulated powder and again cold pressed to form pellets or agglomerates of boron nitride particles with the operations of cold pressing and granulation occurring in one or more stages.

6 Claims, 5 Drawing Sheets

METHODS FOR PRODUCING HIGH GREEN DENSITY BN COMPACTS

METHOD FOR FORMING HIGH DENSITY BORON NITRIDE AND HIGH DENSITY AGGLOMERATED BORON NITRIDE PARTICLES

This application is a division of application Ser. No. 08/968,959 filed Nov. 12, 1997, Pat. No. 5,898,009, which is a continuation of application Ser. No. 08/618,361 filed Mar. 19, 1996, abandoned.

FIELD OF THE INVENTION

The present invention relates to a method for forming high density boron nitride for use as precursor feedstock material in the conversion of hexagonal boron nitride to cubic boron nitride and as high density agglomerated boron nitride particles formed from such method for use as high thermal conductivity fillers.

BACKGROUND OF INVENTION

The two conventional forms of hexagonal boron nitride are turbostratic boron nitride and ideal or graphitic boron nitride. The hexagonal form of boron nitride is used in the conversion to cubic boron nitride and as a filler material for many other applications particularly where high thermal conductivity and high electrical resistivity is required. Typically, turbostratic boron nitride is first purified into what is conventionally referred to as "high purity hexagonal boron nitride" by treatment at high temperature, typically between about 1800° C. to 1900° C., for removing volatile impurities and surface oxide contaminants. Such high temperature treatment causes the boron nitride to become highly agglomerated in consistency which must be broken down for suitable commercial application. Accordingly, current practice is to first mill the high purity boron nitride into a fine powder and then, for ease of handling, to cold press and granulate the boron nitride in one or more stages. The milling operation forms a fine powder of small particle size typically with 99.9% of all of the milled powder below −325 mesh. The average particle size of the milled powder lies between 5–11 microns. The density of the boron nitride pellets formed from the cold pressing operation is no greater than an average of about 1.80 g/cc or 80% of the theoretical density of hexagonal boron nitride independent of the number of repeated granulation and cold pressing stages.

In the conversion of high purity hexagonal boron nitride to cubic boron nitride the compacts or pellets of boron nitride formed by compaction are subjected to extremely high pressures and temperatures within the stable region of the cubic boron nitride phase diagram. The density of the boron nitride pellets is significant to the economics of the cubic boron nitride conversion process.

It has been discovered in accordance with the present invention that the density of cold pressed boron nitride powder may be substantially increased to a density of at least about 1.86 g/cc and approximating 1.9 g/cc i.e approximating 85% of theoretical by controlling the particle size distribution of the boron nitride particles prior to compaction so that the distribution of particle sizes is as wide as possible and preferably with the majority of the particles having a particle size above 50 microns. The preferred particle size range for the majority of the particles should be between 20–500 microns. It has been further discovered in accordance with the present invention that agglomerated particles of boron nitride formed from a wide boron nitride particle size distribution following cold press compaction and granulation will possess a density closer to the average density achieved with hot pressing. In addition its thermal conductivity for use as a filler is enhanced particularly for use as a filler material in polymer composites.

SUMMARY OF THE INVENTION

The method of the present invention broadly comprises the steps of forming high purity hexagonal boron nitride; crushing said high purity hexagonal boron nitride into boron nitride particles extending in size over a size range of at least 100 microns with the majority of the particles having a particle size above 50 microns, cold pressing the crushed particles into a compacted form and granulating the compacted particles into a granulated powder with the operations of cold pressing and granulation occurring in one or more stages.

Agglomerated boron nitride particles of high density and high thermal conductivity are also formed from cold pressed hexagonal boron nitride in accordance with the present invention by the process of crushing high purity hexagonal boron nitride into boron nitride particles extending in size over a size range of at least 100 microns with the majority of the particles having a particle size above 50 microns, cold pressing the crushed particles into a compacted form, granulating the compacted form into a granulated powder, with the cold pressing and granulation steps occurring in one or more stages, to a suitable size for use as fillers of high thermally conductivity.

BRIEF DESCRIPTION OF THE DRAWINGS

The advantages of the present invention will become apparent from the following detailed description of the present invention when read in conjunction with the accompanying drawings of which.

DETAILED DESCRIPTION OF THE INVENTION

Figure 1A:
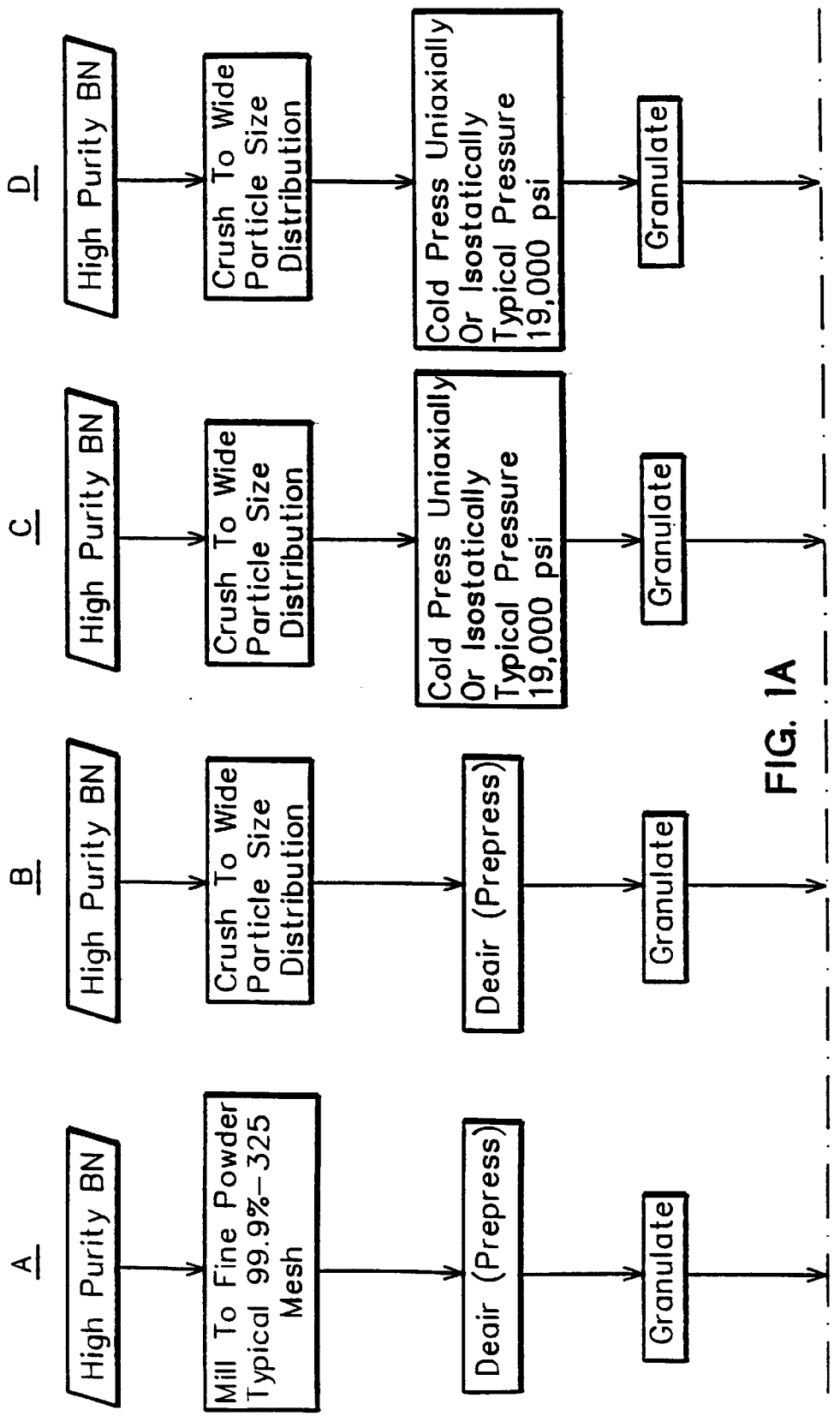
FIGS. 1A and 1B show four schematic flow diagrams labeled A,B,C, and D comparing the standard prior art method of compaction labeled A for cold pressing high purity boron nitride with the alternate methods of the present invention labeled B.C., and D respectively.
Figures 1, 1A, 1B:
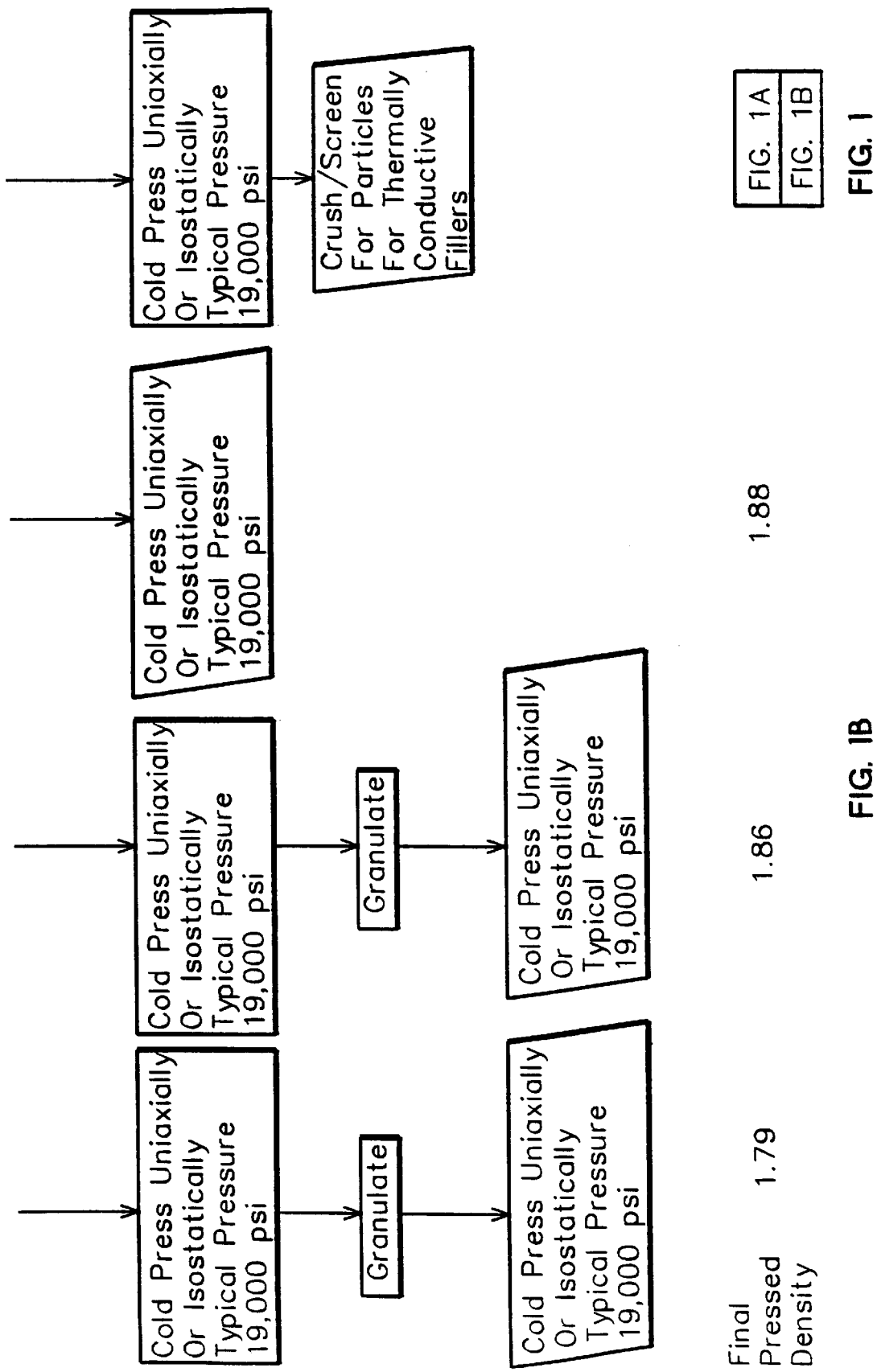

The schematic flow diagram labeled A in FIG. 1 (FIGS. 1A and 1B) illustrates the current practice of forming a compact of cold pressed boron nitride starting from high purity boron nitride material. The high purity boron nitride material is converted into a very fine high purity hexagonal boron nitride (hBN) powder using a conventional milling operation utilizing, e.g., a high speed impact mill to reduce the BN to a fine powder. Typical properties of the fine high purity BN powder are shown below in Table I.

TABLE 1

Properties of Milled High Purity BN &
Final Compacted Density (After 2 Cycles)

| Sample | 1 | 2 | 3 | 4 |
|---|---|---|---|---|
| % Oxygen | 0.605 | 0.488 | 0.275 | 0.548 |
| Surface Area ($m^2/g$) | 5.67 | 5.48 | 5.26 | 6.39 |
| Tap Density (g/cc) | 0.58 | 0.60 | 0.51 | .47 |
| % Soluble Borates | 0.33 | 0.16 | 0.10 | .26 |
| −325 Mesh Sizing | 99.9 | 99.9 | 99.9 | 99.9 |
| Avg. Part. Size (μm) | 10.62 | 10.05 | 10.25 | 9.59 |
| Max. Part. Size (μm) | 42.2 | 29.9 | 29.9 | 29.9 |
| Density (g/cc) (2X) | 1.80 | 1.79 | 1.77 | 1.81 |
| % Theoretical Density | 80.0 | 79.6 | 78.7 | 80.44 |

As evident from the above Table 1 in conjunction with FIG. 1 column A the fine powder formed from the milling operation has a particle size distribution such that 99.9% is milled to below −325 mesh (44 micron) and has an average particle size of 5–11 microns and a maximum particle size of no more than about 42 microns. The size of this powder is difficult to handle and to compact. With the powder being so fine, it needs to be deaired (prepressed) before compaction. If it is not deaired, the powder tends to flow out of the press die during compaction. Deairation is typically conducted by pressing the powder at a relatively high pressure in a large uniaxial press. The resultant cake is then granulated. This feedstock is then loaded into the hopper of an automated uniaxial press, for continuously pressing the powder into small pellets or plugs of material of e.g., 2.25" diameter×2" long. After the first pressing, the compacted boron nitride (BN) may again be granulated and again compacted in the automated uniaxial press. In fact the deairation/compaction/granulation procedure may be repeated in any number of stages. As can be seen FIG. 4, the highest green density achieved for a compact formed from milled powder was 1.74 g/cc or 77.3% of theoretical. By repeating the compaction/granulation steps the density increased slightly as indicated in sample 4 in Table 1 to a density of 1.81 g/cc. Additional stages of compaction/granulation will have little effect on the density as is confirmed in FIG. 4. Also, from observation the tops of the compacted pellets have a tendency to delaminate, indicating springback after pressing. It was discovered that the density of the compacted pellets may be increased to approximately 1.9 g/cc i.e. up to 85% of theoretical by controlling the distribution of the boron nitride particle sizes before compaction by extending the range of particle sizes to a range of over at least 100 microns. The preferred method for achieving a wide particle size distribution is to crush the hard chunks of high purity BN resulting from the low purity boron nitride high temperature treatment. This yields a wide distribution of particle sizes as is evident in Table II shown below and in FIG. 3. This is accomplished in accordance with the method of the present invention by substituting a crushing operation for the milling operation as is evident in FIG. 1 flow sequence B,C and D respectively. The crushing operation as shown in flow diagram B may be followed by the standard deairation/granulation-compaction/granulation stages as used in the standard flow diagram A of FIG. 1 or only by compaction/granulation stages without a deairation step as shown in the flow diagram sequences C or D of FIG. 1. The final step of the flow diagram sequence D of FIG. 1 is a crushing operation to produce a wide particle size dispersion of agglomerated boron nitride particles. This is particularly useful as a thermally conductive filler material particularly to fill polymers.

TABLE II

Properties of Crushed High Purity BN &
Final Compacted Density (After 2 Cycles)

| Sample | 1* | 2 | 3 | 4 |
|---|---|---|---|---|
| Oxygen | 0.571 | 0.275 | 0.426 | .60 |
| Surface Area ($m^2/g$) | 3.16 | 5.26 | 2.51 | 3.02 |
| Tap Density (g/cc) | 0.76 | 0.85 | 0.92 | .89 |
| % Soluble Borates | — | 0.10 | 0.09 | .14 |
| Screen Sizing | | | | |
| +40 | — | 11.12 | 71.64 | 67.51 |
| −40 +80 | — | 41.46 | 12.04 | 13.72 |
| −80 +100 | — | 6.16 | 1.08 | 1.82 |
| −100 +150 | — | 8.36 | 2.20 | 3.01 |
| −150 +200 | — | 5.76 | 1.44 | 2.42 |
| −200 +325 | — | 7.32 | 2.32 | 2.90 |
| −325 | 11.16 | 19.82 | 9.28 | 8.62 |
| Density (g/cc) (2X) | 1.86 | 1.89 | 1.91 | 1.84 |
| % Theoretical Density | 82.70 | 84.0 | 84.90 | 81.78 |

*Note: Sample 1 was crushed and screened to remove the fines. Samples 2 and 3 were not.

The above Table II shows the typical properties for roll crushed high purity boron nitride. Crushing of the high purity boron nitride material leaves a much wider particle size distribution and higher tap density, both of which are evident from table II result in a higher compaction density. The tap density of the crushed particles is at least 0.76 g/cc. The sample 1 lot was screened to remove the fines whereas samples 2, 3 and 4 were not screened. The tap density and precompacted density of Sample 1 is higher than the milled samples but is less than samples 2, 3 and 4. The deairation step was eliminated in Samples 1–3 of the roll crushed lots and a uniaxial pressing, granulation, uniaxial pressing procedure as described with the milled material was used for compaction. The compacted density is significantly higher than in Table I. Also, delamination did not occur with these samples, indicating less of a tendency for springback. The higher compacted densities and lower tendency for springback in the roll crushed material are useful for conversion to cubic boron nitride. The flow diagram D in FIG. 1 may be used to produce boron nitride crushed agglomerated particles as high thermally conductive fillers.

The following are examples of the present invention:

EXAMPLE 1

Figure 2:
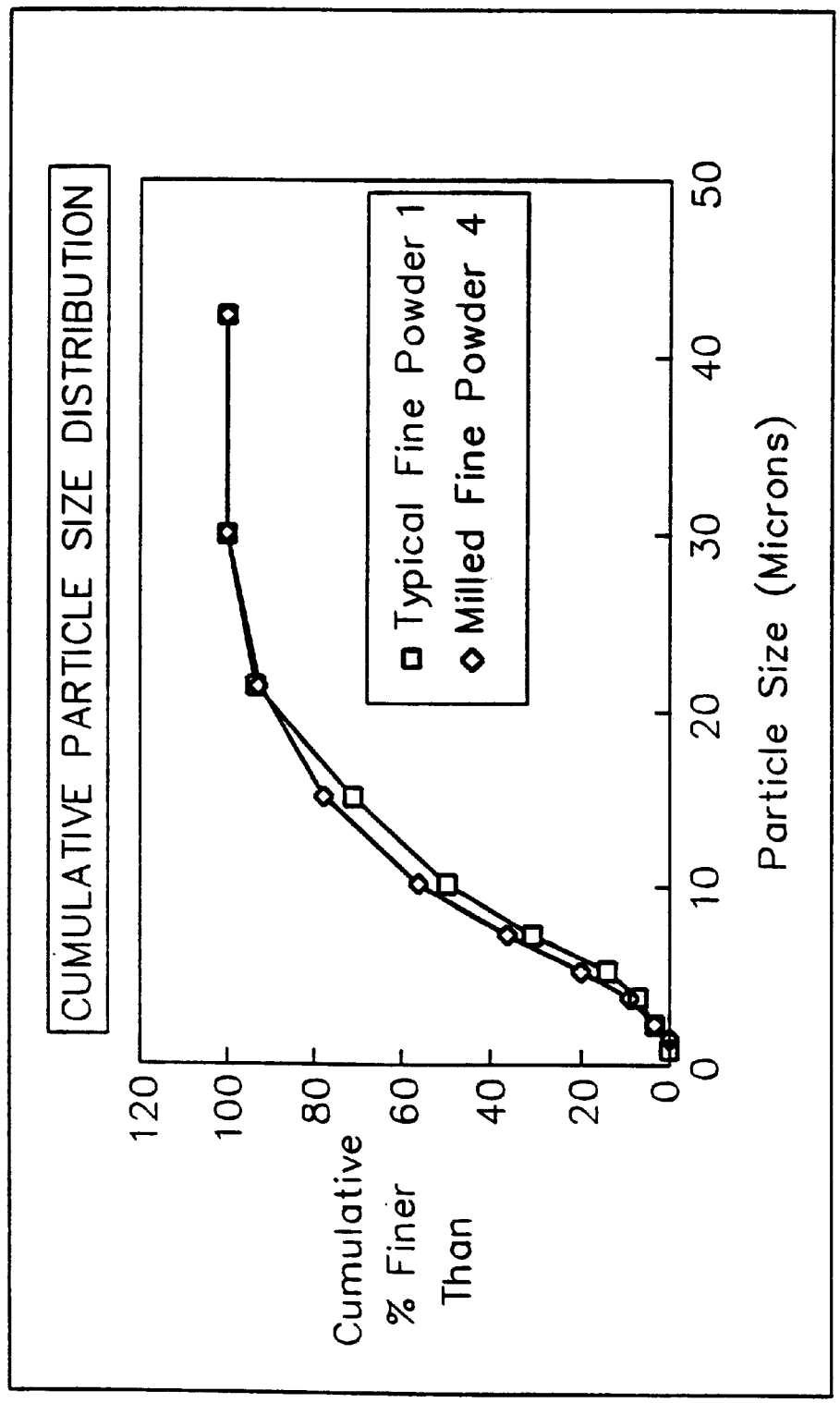
FIG. 2 shows typical particle size distribution curves for the high purity boron nitride particles formed from the milling operation used in the standard compaction method A of FIGS. 1A and 1B.
Figure 3:
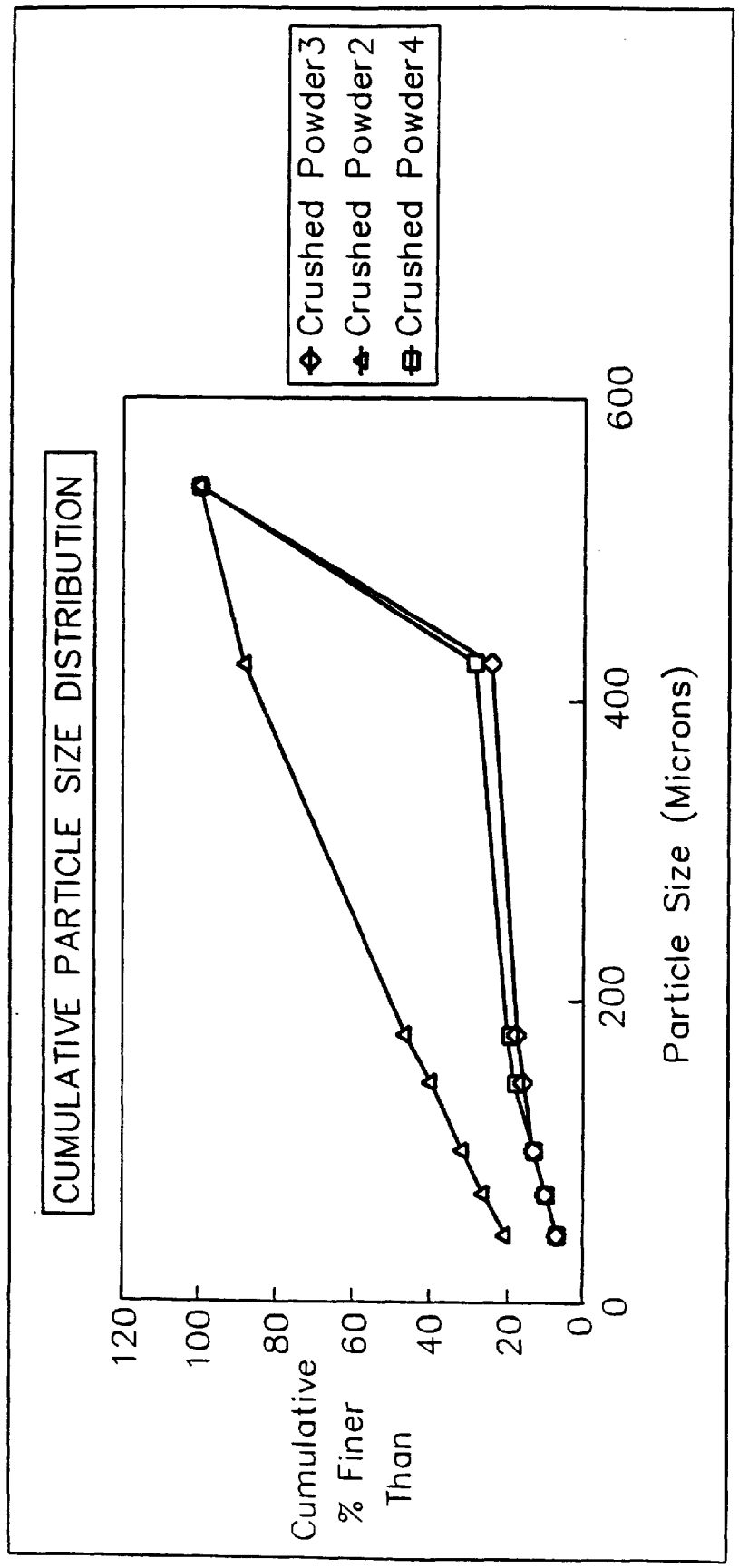
FIG. 3 shows a corresponding particle size distribution curve for the high purity boron nitride particles formed from crushing high purity boron in each of the alternate methods B, C and D shown in FIGS. 1A and 1B.
Figure 4:
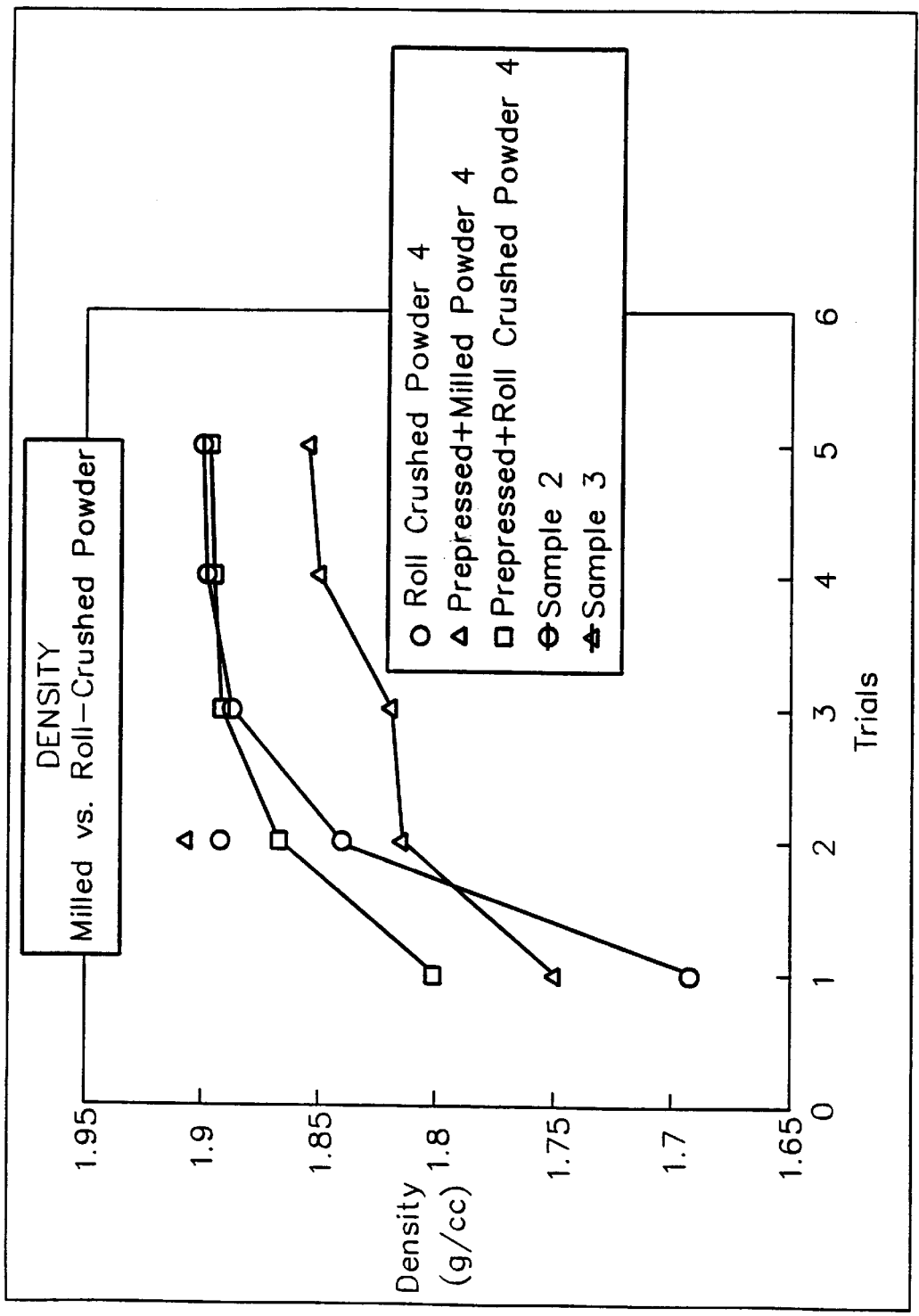
FIG. 4 is a graph showing the relationship of density to the powder compaction cycle i.e. number of powder compaction stages for milled and crushed powder.

Highly agglomerated high purity boron nitride powder was crushed in a roll mill to the particle size distribution shown in FIG. 3 with properties as shown in Table 2 column 3. This powder was was compacted using a horizontal press at a pressure of 19,000 psi. The compacted pieces were granulated by forcing the material through a screen with openings approximately ½ inch. The granulated particles were again compacted at 19,000 psi. The procedure is outlined in FIG. 1 in the flow diagram labeleed C. The density of the resultant compact was 1.91 g/cc. For comparison a highly agglomerated high purity boron nitride powder was milled to a fine powder using the standard milling procedure as shown in the flow sequence A of FIG. 1. The properties of this powder Sample 4 are shown in Table 1 column 4. The particle size distribution of this powder is shown in FIG. 2 as the curve labeled "Milled Fine Powder 4". This fine powder was deaired at 2500 psi and granulated followed again by compaction, granulation and compaction as outlined in FIG. 1 flow diagram A. The density of the resultant compacts were only 1.81 g/cc.

EXAMPLE 2

Highly agglomerated, high purity boron nitride powder was crushed in a two roll mill to the particle size distribution as shown in FIG. 3 labeled as "Crushed Powder 4". The properties of this powder are shown in Table 2 column 4. This powder was compacted using a horizontal press at a pressure of 19,000 psi. Four additional granulation/compaction steps as described in example 1 were performed. The resultant compact density was 1.91 g/cc. The density of the compacts as a function of compaction cycles is shown on FIG. 4, on the curve labeled "Roll Crushed Powder 4". In comparison the highly agglomerated high purity boron nitride powder was milled to a fine powder. The properties of this powder are shown in Table 1 column 4. The particle size distribution of this powder is shown in FIG. 2 as the curve labeled "Milled Fine Powder 4". This fine powder was deaired at 2500 psi and granulated followed by the same five cycles of granulation and compaction as was done for the crushed powder. The density of the resultant compacts was only 1.84 g/cc. The density of the compacts as a function of compaction cycles is shown on FIG. 4 on the curve labeled "Prepressed+Milled Powder 4".

EXAMPLE 3

Highly agglomerated, high purity boron nitride powder was crushed in a roll mill to the particle size distribution shown on FIG. 3 labeled as "Crushed Powder 2". The properties of this powder are shown in Table 2 column 2. This powder was compacted using a horizontal press at a pressure of 19,000 psi. The compacted pieces were granulated by forcing the material through a screen with openings approximately ½ inch. The granulated particles were again compacted at 19000 psi. The density of the resultant compact was 1.89 g/cc. This should be compared with the four different fine milled powders of Table 1 in which the resultant compact densities are 1.80, 1.79, 1.77, and 1.81 g/cc respectively.

EXAMPLE 4

Highly agglomerated high purity hexagonal boron nitride powder with the properties as indicated on Table 2 Column 4, was crushed using a roll mill to the particle size distribution shown on FIG. 3 in the curve labeled "Crushed Powder 4". This crushed powder was compacted at 19,000 psi using a powder compaction press (uniaxial press), and was then formed into granules of ¹⁄₁₆ inch and finer using a granulator. The granules were once again compacted at 19,000 psi. These compacts were crushed using a sawtooth and roll crusher and screened through a 120 mesh screen, resulting in a powder that had a tap density of 0.68 $m^2/g$. The screened particles were added to a cresol novalak thermoset epoxy formulation with a phenol novalak hardener at a 65 wt % BN loading, and then molded in a transfer press. The thermal conductivity of the molded compound was 7.4 W/m° C.

The pellets or compacts may again be crushed into a powder compound of agglomerates having a wide particle size distribution. These agglomerates are of higher density than corresponding agglomerates formed from milled powder undergoing the same steps.

What we claim is:

1. A method of forming pellets or agglomerates consisting of high density boron nitride comprising the steps of forming high purity hexagonal boron nitride; crushing said high purity hexagonal boron nitride into boron nitride particles extending in size over a size range of at least 100 microns with the majority of the particles having a particle size above 50 microns, cold pressing the crushed particles into a compacted form and granulating the compacted particles into a granulated powder with the operations of cold pressing and granulation occurring in one or more stages for forming pellets of boron nitride or agglomerates of high density boron nitride.

2. A method as defined in claim 1 further comprising the additional step of crushing the compacted boron nitride into a multiplicity of particles which vary in size over a wide particle size distribution with a majority of particles lying in the size range of between 20–500 microns and agglomerating the boron nitride particles for use as a filler.

3. A method as defined in claim 1 wherein the majority of the particles have an average particle size above 200 microns.

4. A method as defined in claim 3 wherein said particle size range extends from below 20 microns to above 400 microns.

5. A method as defined in claim 4 wherein said particle size range extends up to 500 microns.

6. Boron nitride pellets consisting of boron nitride having a density of between 1.86 and 1.91 g/cc for use in converting hexagonal boron nitride into cubic boron nitride formed by the process comprising: crushing high purity hexagonal boron nitride into a multiplicity of boron nitride particles which vary in size extending over a particle size range of at least 100 microns with the majority of the particles above 50 microns in size, cold pressing the crushed particles into a compacted form, granulating the compacted particles into a granulated powder and cold pressing the granulated powder into pellets with the operations of cold pressing and granulation occurring in one or more stages.

* * * * *